United States Patent [19]
Hughes

[11] 3,872,407
[45] Mar. 18, 1975

[54] RAPIDLY TUNABLE LASER

[75] Inventor: Richard Swart Hughes, China Lake, Calif.

[73] Assignee: The United States of America as represented by the Secretary of the Navy, Washington, D.C.

[22] Filed: Sept. 1, 1972

[21] Appl. No.: 287,113

[52] U.S. Cl......... 332/7.51, 331/94.5 C, 350/162 R
[51] Int. Cl............................ H01s 3/05, H01s 3/10
[58] Field of Search.................. 331/94.5 A, 94.5 C; 332/7.51; 350/6, 161 R, 162 R, 350/285, 160; 356/100

[56] References Cited
UNITED STATES PATENTS

| | | | |
|---|---|---|---|
| 1,800,018 | 4/1931 | Hathaway | 350/285 |
| 1,800,601 | 4/1931 | Centeno | 350/285 |
| 3,232,164 | 2/1966 | Harn et al. | 88/14 |
| 3,443,243 | 5/1969 | Patel | 350/162 R |
| 3,546,620 | 12/1970 | Erickson et al. | 350/285 |
| 3,556,638 | 1/1971 | Banks et al. | 350/285 |
| 3,592,523 | 7/1971 | Wu | 350/285 |
| 3,603,690 | 9/1971 | Hard | 350/162 R |
| 3,672,746 | 6/1972 | Miller | 350/160 R |
| 3,697,889 | 10/1972 | Dewey | 350/162 R |
| 3,743,965 | 7/1973 | Offner | 331/94.5 C |

OTHER PUBLICATIONS

Korpel, "Phased Array Type Scanning of a Laser Beam," October 1965, p. 1666e, Proc. of IEEE.
Kato et al., "Tuning a Dye Laser λ by . . . ," 5/72, pp. 134–136, Optics Communications, Vol. 5, No. 2.
Lee et al., "Single Mode Power From a 6328A Laser . . . ," 12/1/68, pp. 373–375, Appl. Phys. Lett., Vol. 13, No. 11.

Primary Examiner—Maynard R. Wilbur
Assistant Examiner—N. Moskowitz
Attorney, Agent, or Firm—R. S. Sciascia; Roy Miller

[57] ABSTRACT

A tunable laser having a rotatable mirror as one portion of the laser cavity and a diffraction grating positioned with respect to the rotatable mirro such that the rotatable mirror causes the laser beam to scan the diffraction grating and thereby change the effective wavelength of the output laser beam.

8 Claims, 6 Drawing Figures

$\theta_1 - \theta_2 = 2\theta_3$

RAPIDLY TUNABLE LASER

CROSS REFERENCE TO RELATED APPLICATIONS:

U.S. Patent application Ser. No. 287,112, filed Sept. 1, 1972 by Richard S. Hughes.

U.S. Patent application Ser. No. 285,979, filed Sept. 5, 1972 by Richard S. Hughes now U.S. Pat. No. 3,802,775.

BACKGROUND OF THE INVENTION

The invention relates to a means for rapidly tuning a laser such that the effective wavelength of the output laser beam is changed. The tuning of an organic dye laser was first accomplished in 1967 by Soffer and McFarland when they replaced the back reflector of the optical resonant cavity with a reflection grating (dispersive element). The grating narrowed the line width of the stimulated emission of rhodamine 6 G from the 6-nm broadband case to 0.06 nm. Continuous tuning of the narrow-band laser emission was accomplished by simply rotating the grating and it was found that the bandwidth over which the laser could be tuned was much greater than the 6-nm bandwidth of broadband laser emission.

Another method of tuning the output frequency of a laser is illustrated and described in U.S. Pat. No. 3,442,370.

SUMMARY OF THE INVENTION

Briefly, the present invention is directed to a laser in which the output wavelength may be rapidly and continuously varied. The system comprises a dye cell positioned within an optical cavity and a tuning mirror of said optical cavity which is mounted so that it may be rotated. Positioned with respect to the tuning mirror is a diffraction grating such that when the tuning mirror is rotated, the laser beam is scanned across the diffraction grating thereby changing the output wavelength of the laser cell.

DESCRIPTION OF THE PREFERRED EMBODIMENTS

This invention is concerned with the rapid tuning of an organic dye laser. One characteristic of the organic dye laser that sets it apart from other tunable lasers is the ease and speed with which its output beam can be tuned or changed continuously from one wavelength to another. The versatility and usefulness of this type of laser can be enhanced by increasing the rate at which tuning can be accomplished.

An organic dye laser consists of a pump source, an optical resonant cavity and an active laser medium (dye). When broadband reflectors are used at the ends of the optical resonant cavity, the stimulated emission of the laser is broadband with a typical structural half-width of about 10 nanometers. If either a dispersive or filter element is placed in the optical resonant cavity the optical energy storage capacity, U, of the cavity remains high for just a single narrow spectral band corresponding to the pass band of the filter or the reflected band of the dispersive element. Thus, stable oscillation can occur only in this narrow band. By changing the wavelength of the narrow spectral band, the output laser beam can be tuned continuously to wavelengths throughout the fluorescent emission profile of the dye.

Figure 1:
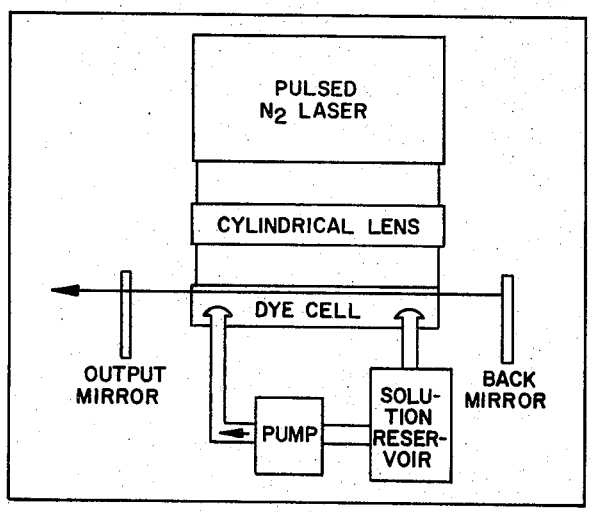
FIG. 1 is a physical layout of an organic dye laser.

In the embodiments of the present inventions, the pump source utilized is a pulsed nitrogen gas laser operating at 337.1 nm with a pulse repetition rate continuously variable from 5 to 500 pulses per second. The pulses produced have a peak power of 100 kw and an effective pulse width of 10 nanoseconds. The output beam from the nitrogen gas laser is rectangular and lends itself well to the transverse pumping configuration shown in FIG. 1. The cavity of the organic dye laser and thus, the dye laser output beam are aligned at right angles to the nitrogen pumping beam. The cylindrical lens, which has a focal length of 7.6 cm, is used to focus the rectangular beam to a fine line along the 5.7 cm length of the dye cell. The cylindrical lens is mounted at the side of the cavity directly opposite the dye cell 11 to insure that the focused pumping beam will encompass the entire length of the cell without wasting any of the pump energy. The nitrogen beam has a horizontal divergence of 30 milliradians so that, by properly positioning the laser cavity with respect to the pump source, the focused beam can be made to encompass the full length of the cell, and maximum pump efficiency can be obtained.

Figure 2:
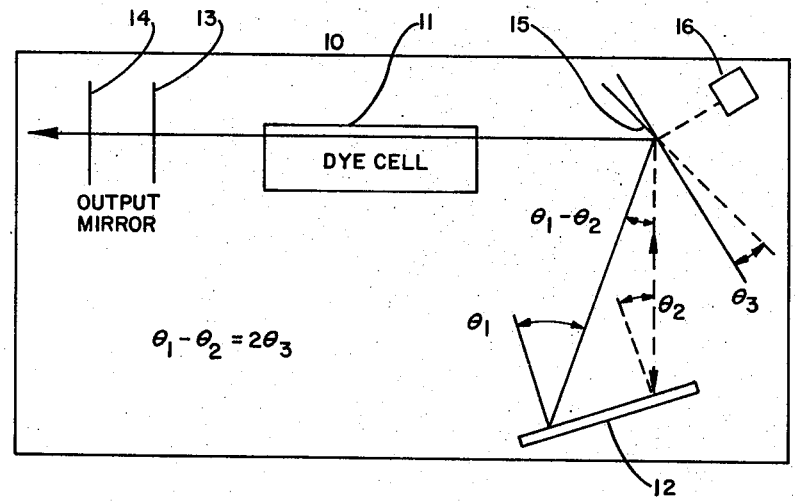
FIG. 2 is schematic showing of the top view of one embodiment of the invention.

One embodiment of the invention is illustrated in FIG. 2 and comprises a galvanometer-driven laser tuning system. A flowing dye cell 11 lies at the center of the laser cavity 10 with its associated teflon tubing secured to reduce vibrations caused by the flowing solution. A grating 12 and front mirror 13 are placed in standard laser mirror mounts which are fastened securely to an I-bean on either side of the dye cell 11. The mounts are equipped with micrometer adjustments for ease of alignment. An iris 14 is placed in front of the output mirror 13 and serves as an external mode selecting aperture to block any super-radiant emission from the laser beam and thereby assure an output beam of highest possible quality.

A tuning mirror 15 is located between the dye cell 11 and grating 12 to intercept the internally oscillating laser beam and scan it across the grating 12. The mirror 15 is physically controlled by a galvanometer 16. The galvanometer-controlled mirror 15 is 5 mm in diameter and has a resonant frequency of 3 kilohertz. An amplifier (not shown) is used to drive the galvanometer which contains an adjustable feedback circuit to minimize overshoot when it is used in the random access mode.

There are two significant advantages gained by rotating the mirror 15 to scan the beam across the grating 12 rather than rotating the grating itself: (1) the tiny mirror can be rotated much more rapidly than can the relatively massive grating and (2) the tuning range and tuning rate of the system are doubled by using the optical scanner instead of rotating the grating. The simple geometry of the configuration, as shown in FIG. 2, transforms an angular rotation of the tiny mirror into an angular scan across the grating that is double the angle through which the mirror is rotated, $\theta_1 - \theta_2 = 2\theta_3$. While the grating would have to be rotated 5.9 degrees in order to scan across the 40-nm lasing band of the dye contained within the cell 11, the mirror 15 need only be rotated 2.95°.

The ease with which this laser configuration can be aligned makes it particularly attractive also. A HeNe laser facilitates the alignment of the output mirror, the grating, the dye cell and the tuning mirror. Then, with the pump beam turned on, the cavity is positioned properly and the cylindrical lens is adjusted to obtain a sharply focused line on the side of the dye cell. The brightest possible output beam is obtained by a fine adjustment of the cavity position, the output mirror, the grating, the lens and the solution flow rate.

Once the laser is operating, rapid tuning is accomplished by simply applying the desired tuning waveform; ramp, sinusoidal, random step, etc., at the input of the driver amplifier for the galvanometer 16. The input signal is obtained from a function generator (not shown) which is synchronized with the pump pulses of the nitrogen gas laser.

If a pulse counter designed to produce an output pulse for a given number of input pulses (1, 2, 3, 4 . . . ) is used to trigger the function generator, the scanning wave-form can be made to repeat itself periodically. Thus, for a counter setting of 10, the scanning wave-form will be triggered on every tenth laser pulse. If a ramp input is used with a counter setting of 10, the duration of the ramp can be adjusted to encompass up to 10 laser pulses, each of which will have a different characteristic wavelength. The amplitude of the ramp determines the scan angle of the mirror and thus, range of wavelengths encompassed by the 10 pulses. For this system, a 0.4 volt ramp will produce a 40 nanometer wavelength scan. For a counter setting of 20, up to 20 pulses of different wavelengths can be encompassed by the scan; for a setting of 30, up to 30 pulses can be encompassed, etc.

Figure 3A:
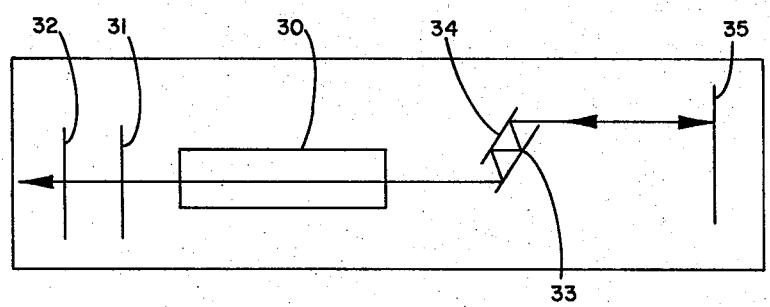
FIGS. 3a and 3b are a side view and top view respectively of another embodiment of the invention.
Figure 3B:
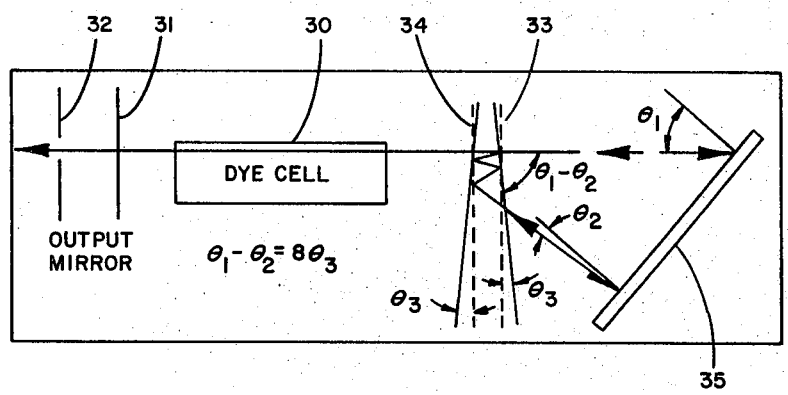

Another embodiment of the invention comprises a bimorph strip laser tuning system with the associated laser cavity as set forth in FIGS. 3a and 3b. This laser, like the galvanometer-driven system, is constructed on the flat surface of an aluminum I-beam, uses a reflection grating for wavelength selection and is equipped with an optical scanner to move the internal laser beam across the face of the grating. However, the optical scanner in this case is a laser beam scanner consisting of two tiny mirrors on voltage-sensitive piezoelectric bimorph strips mounted inside the cylindrical case between the dye cell and the grating. Thus, with respect to FIG. 3a, there is illustrated a dye cell 30 having an output mirror 31, iris 32, mirrors 33 and 34, comprising the bimorph scanner, and a reflective grating 35.

As discussed in connection with the galvanometer-driven system, the placing of a single mirror between the dye cell and the grating tends to double the angle of rotation of the mirror as seen by the grating. Similarily, as illustrated in FIG. 3a, two nominally parallel mirrors 33 and 34 can be positioned so that a given number of reflections occur at each mirror and the output scan is parallel to, but slightly displaced from, the input beam. If the two mirrors are made to rotate in opposite directions, the angle through which the mirrors are rotated, $\theta_3$, will be amplified by a factor of 2 for each mirror reflection as the angle of rotation is transformed to an angle of incidence on the grating. Since the scanner represented in FIG. 3 is positioned to obtain two reflections per mirror, or four total reflections, the resulting angular amplification is $8 \times (\theta_1 - \theta_2 = 8\theta_3)$. With this particular scanner, up to five reflections per mirror can be obtained, 20 times angular amplification, which means that a mirror rotation of 0.3° will produce a 40 nm wavelength scan across the grating.

Laser alignment is again achieved with the aid of a HeNe laser and use of the alignment techniques described in conjunction with the galvanometer-driven system.

Figure 4:
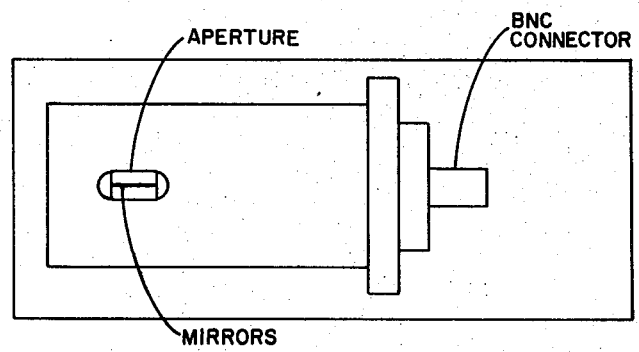
FIG. 4 is an illustration of the bimorph strip scanner.

A side view of the clyindrical case that houses the two scanning mirrors of the bimorph strip scanner is set forth in FIG. 4. Preliminary alignment of the scanner in the position shown in FIG. 4 is such that the laser beam enters the scanner orthogonal to the plane of the aperture and near its center and will produce a single reflection per mirror and an angular amplification of 4×. If a greater angular amplification is desired the scanner is rotated slightly about its axis until the desired number of reflections per mirror are obtained. This rotation, of course, reduces the effective aperture, making precise alignment of the scanner more difficult as the angular amplification is increased. For example, if the angular amplification is increased from 4× to 20×, the effective aperture is reduced from 5 to 2 mm.

Rapid tuning of the bimorph strip scanner is accomplished by simply applying the output of a function generator to the bimorph strips at the BNC connector shown in FIG. 4. As the input voltage changes, the bimorph strips bend back and forth in opposite directions to produce the angular rotation of the mirrors as set forth in FIG. 3.

The output of this system, just as that of the galvanometer system, can be synchronized with the nitrogen laser pump pulses and the scanning waveform can be made to encompass a given number of laser pulses by using a pulse counter to trigger the scan. The input signal amplitude that must be applied to the bimorph strips in order to produce a 40-nm wavelength scan varies considerably with the scan frequency and the type of waveform used. The static response of the scanner is 4-nm per volt. Thus, a 10-volt change in the DC voltage applied to the bimorphs will produce a 40-nm change in the wavelength of the tuned laser output.

Figure 5:
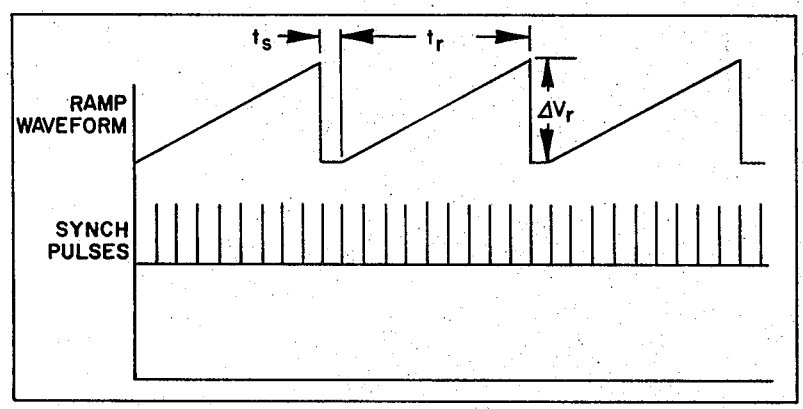
FIG. 5 is a graph of the tuning waveform and synchronizing pulses.

Although the optical scanner can be operated at frequencies as high as 5 kilohertz, the scan frequency of the present system is limited to 500 Hz, since the nitrogen gas laser can only be operated at pulse repetition frequencies up to 500 pulses per second. In practice, however, the actual scan frequency must be less than 500 Hz in order to produce more than one laser pulse per scan as illustrated in FIG. 5. If the 40 nonometer scan is made to encompass 10 laser pulses at 500 pulses per second, the scan frequency is reduced to 50 Hz. If the laser output beam is then observed with a wavelength reversion spectroscope, 10 equally spaced lines ranging in color from green to red (570 to 610-nm) can be observed. Up to 30 resolvable lines have been observed with the spectroscope using the present invention. If more than 30 pulses are encompassed within the tuning range of the dye, the output observed with the spectroscope appears to the eye as a continuum from green to red.

FIG. 5 is a graph illustrating a ramp waveform similar to the waveform used to drive the tuning devices. Beneath the ramp waveform is a trace of the synchronizing laser pulses from the nitrogen gas laser. For this case, the pulse counter is set at 10 so that the scanning waveform is triggered on every tenth pulse and the ramp duration is such that the waveform encompasses nine pulses per cycle.

The amplitude of the pulses is arbitrary as is the time scale.

To determine $t_s$ and $t_r$ for a given system, the pulse repetition frequency is set at 500 pulses per second and the tuning device is first driven by an arbitrary ramp whose falling edge is made to coincide with the trigger of the succeeding ramp. Thus, $t_s = 0$ in FIG. 5. The ramp duration is then decreased slightly until all oscillatory transients disappear; i.e., when the lines observed through a wavelength reversion spectroscope are equally spaced and stationary. If the lines are stationary and equally spaced, the scan is very nearly linear and each scan begins at the same wavelength (within $\pm \Delta\lambda_R$). Once this condition is met and the spectroscopic lines cover the entire tuning range, $\Delta\lambda_T$, the settling time, $t_s$, can be read directly from the oscilloscope trace as indicated in FIG. 5.

Next, $t_s$ is held constant while the ramp duration is decreased until a minimum number of pulses are encompassed by the ramp. However, when observed as lines in the spectroscope, these pulses must still cover the tuning range $\Delta\lambda_T$. The parameter $t_r$ for this condition is simply the ramp duration as shown in FIG. 5. At least two pulses must be encompassed by each ramp, one pulse as each extreme of the tuning range. Therefore, for a 500 pulse per second system, the minimum attainable $t_r$ is approximately 4 milliseconds.

The details of the replica gratings, tuning mirrors, generators, amplifier drivers, filters, bimorphs, etc., are not disclosed in detail in that they relate to commercially available items, the details of which form no part of the present invention.

What is claimed is:

1. A rapidly tunable laser comprising;

a laser cavity having an output mirror as a front element;

a dispersive means fixedly mounted with respect to the laser path as a back reflective element;

laser means positioned within said cavity for outputting a laser beam of a given wavelength and being adapted to be tuned across a given bandwidth;

tuning means optically and movably positioned between said laser and said dispersive means so that it may be driven to cause a physical movement thereof and a corresponding movement of the laser beam;

said dispersive means being positioned with respect to said tuning means so that when the tuning means is driven the laser beam is scanned across the fixed dispersive means thereby causing the output wavelength of the laser to change dependent upon the amount of scan.

2. A rapidly tunable laser as set forth in claim 1 wherein; said tuning means comprises a mirror.

3. A rapidly tunable laser as set forth in claim 1 wherein; said dispersive means comprises a diffraction grating.

4. A rapidly tunable laser as set forth in claim 1 wherein said laser means comprises a dye laser.

5. A tunable laser as set forth in claim 2 wherein; said tuning mirror comprises a bimorph scanning system.

6. A tunable laser as set forth in claim 2 and further including;
   driving means connected to said tuning mirror.

7. A tunable laser as set forth in claim 6 wherein; said driving means comprises a galvanometer.

8. A tunable laser as set forth in claim 5 wherein; said bimorph scanning system comprises two tiny mirrors on voltage sensitive piezoelectric bimorph strips.

* * * * *